(12) United States Patent
Liu

(10) Patent No.: US 10,914,361 B2
(45) Date of Patent: Feb. 9, 2021

(54) MULTI-GEAR TORQUER

(71) Applicant: Gang Liu, Henan (CN)

(72) Inventor: Gang Liu, Henan (CN)

( * ) Notice: Subject to any disclaimer, the term of this patent is extended or adjusted under 35 U.S.C. 154(b) by 190 days.

(21) Appl. No.: 16/201,979

(22) Filed: Nov. 27, 2018

(65) Prior Publication Data

US 2019/0093736 A1 Mar. 28, 2019

Related U.S. Application Data

(63) Continuation of application No. PCT/CN2017/085833, filed on May 25, 2017.

(30) Foreign Application Priority Data

May 27, 2016 (CN) .......................... 2016 1 0379491

(51) Int. Cl.
| | |
|---|---|
| *F16H 1/28* | (2006.01) |
| *F16H 57/04* | (2010.01) |
| *F16H 3/44* | (2006.01) |
| *F16H 57/031* | (2012.01) |
| *F16H 57/038* | (2012.01) |

(52) U.S. Cl.
CPC ............ *F16H 1/2854* (2013.01); *F16H 3/44* (2013.01); *F16H 57/031* (2013.01); *F16H 57/038* (2013.01); *F16H 57/04* (2013.01); *F16H 57/0424* (2013.01); *F16H 57/0457* (2013.01); *F16H 57/0486* (2013.01)

(58) Field of Classification Search
CPC ........ F16H 1/2854; F16H 1/2872; F16H 1/30; F16H 3/50; F16H 475/338; F16H 57/082; F16H 57/0408
See application file for complete search history.

(56) References Cited

U.S. PATENT DOCUMENTS

| | | | | |
|---|---|---|---|---|
| 22,721 | A * | 1/1859 | Frezer | F16H 1/2854 |
| | | | | 475/336 |
| 1,392,567 | A * | 10/1921 | Horine | F16H 1/2854 |
| | | | | 475/332 |
| 1,678,798 | A * | 7/1928 | Asprooth | F16H 1/28 |
| | | | | 475/338 |
| 1,902,374 | A * | 3/1933 | Guglielmo | F16H 1/2854 |
| | | | | 475/332 |

(Continued)

FOREIGN PATENT DOCUMENTS

| | | |
|---|---|---|
| CN | 101265960 A | 9/2008 |
| CN | 201133451 Y | 10/2008 |

(Continued)

*Primary Examiner* — Sherry L Estremsky
(74) *Attorney, Agent, or Firm* — W&K IP

(57) ABSTRACT

Disclosed is a multi-gear torquer with end covers on both sides of the casing. An input shaft and an output shaft are respectively arranged at the center of the two end covers. A sun gear is fixed on the input shaft and moves along a planet gear engaged in the transmission mechanism. The planet gear meshes with a gear ring and moves around the sun gear, then the planet gear drives the turntable centrally fixed with the output shaft connected to the load end. The multi-gear torquer disclosed herein has the following advantages: large output torque and high mechanical efficiency, and it can be used as power transmission equipment for a car or a train and used as other mechanical transmission equipment.

5 Claims, 3 Drawing Sheets

(56) References Cited

U.S. PATENT DOCUMENTS

| | | | | |
|---|---|---|---|---|
| 2,005,740 A * | 6/1935 | Harris | F16H 1/2836 |
| | | | 475/335 |
| 3,381,548 A * | 5/1968 | Wolkenstein | F16H 1/2809 |
| | | | 475/338 |
| 3,625,310 A * | 12/1971 | Herrick | F16H 57/0447 |
| | | | 184/6.12 |
| 4,489,626 A | 12/1984 | Lemon | |
| 4,872,530 A * | 10/1989 | Burgess | F16H 57/0482 |
| | | | 184/6.12 |
| 7,654,251 B2 * | 2/2010 | Jones | F04D 25/02 |
| | | | 123/559.1 |
| 8,920,284 B2 * | 12/2014 | Fox | F16C 43/04 |
| | | | 475/348 |
| 9,518,642 B1 * | 12/2016 | Hirao | B60K 17/165 |
| 2015/0148184 A1 * | 5/2015 | Zanella | F16H 1/46 |
| | | | 475/336 |

FOREIGN PATENT DOCUMENTS

| | | | | |
|---|---|---|---|---|
| CN | 201651187 U | 11/2010 | | |
| CN | 102889341 A | 1/2013 | | |
| CN | 105351461 A | 2/2016 | | |
| WO | WO-2018127737 A1 * | 7/2018 | | F16H 1/2854 |
| WO | WO-2020011226 A1 * | 1/2020 | | F16H 1/46 |

\* cited by examiner

MULTI-GEAR TORQUER

CROSS-REFERENCE TO RELATED APPLICATIONS

This application is a continuation of International Patent Application No. PCT/CN2017/085833, filed on May 25, 2017, which claims the benefit of priority from Chinese Application No. 201610379491.4, filed on May 27, 2016. The entire contents of the aforementioned applications, including any intervening amendments thereto, are incorporated herein by reference.

TECHNICAL FIELD

The invention relates to the machinery field, and more particularly to a multi-gear torquer.

BACKGROUND

A variety of power train technologies are well-known, and the gear train especially has a good transmission effect. The gear train has been widely used in power train for its high transmission efficiency, but some power train technologies with energy-saving and more efficient transmission technologies are still being explored.

SUMMARY

Provided is a multi-gear torquer with end covers provided on both sides of the casing. An input shaft and an output shaft are respectively provided at the centers of the two end covers. A sun gear meshes with a planet gear of the transmission mechanism is fixed on the input shaft. The sun gear moves along the planet gear engaged therewith. The planet gear moves along a ring gear engaged therewith. The planet gear moves around the sun gear, and drives a turntable at which the output shaft connected to the load end is fixed. Thus Power transmission is realized.

The multi-gear torquer includes a casing, a first end cover, a second end cover, an input shaft, a sun gear, a transmission mechanism, an ring gear and an output shaft. The casing is fixed on the base, the casing is provided with an oil inlet hole and an oil outlet hole, with lubricating oil disposed at the bottom. The first end cover and the second end cover are set on both sides of the casing, and the input shaft and the output shaft are respectively disposed at the center of the first end cover and the second end cover, the input shaft is fixed with a sun gear moving along the planet gear engaged therewith in the transmission mechanism, the planet gear moves along the ring gear engaged therewith, the planet gear moves around the sun gear and drives the turntable, the center the turntable is fixed with the output shaft connected to the load end.

Two ring gears are integrated with the inner wall of the casing, and the transmission mechanism includes at least three gears, at least one axle, a wheel disc, a turntable component. The at least three gears are fixedly contacted to form at least one planet gear shaped as a superimposed "X" and "+". An axle is provided in an axial direction of the planet gear shaped as the superimposed "x" and "+". A first gear is provided in the middle of the planet gear in a longitudinal direction and two second gears are arranged on both sides of the planet gear shaped as the superimposed "X" and "+" in parallel to mesh with two ring gears. The first gear meshes with the sun gear. The diameter of the sun gear is larger than that of the first gear. The planet gear is slidably contacted with the axle, one end of the axle is fixed to the wheel disc, and the other end is fixed to the turntable. The output shaft connected to the load end is fixed at the center of the turntable.

Further, the second gear is conical, the angle between the conical faces of the two second gears is less than 180 degrees but greater than 0 degrees. The planet gear is provided with a bearing interiorly slidably connected to the axle.

Alternatively, a multi-gear torquer includes a casing, a first end cover, a second end cover, an input shaft, a sun gear, a transmission mechanism, a bevel gear ring, an output shaft. The casing is fixed on the base. The casing is provided with an oil inlet hole and an oil outlet hole, with lubricating oil disposed at the bottom. The first end cover and the second end cover are disposed on both sides of the casing. The input shaft and the output shaft are respectively disposed at the center of the first end cover and the second end cover. The input shaft is fixed with a sun gear moving along the planet gear engaged therewith in the transmission mechanism, the planet gear moves along the ring gear engaged, the planet gear moves around the sun gear and drives the turntable at which center the output shaft connected to the load end is fixed.

The first end cover of the casing is fixed with a bevel gear ring to form a cone disc provided with the input shaft at the center thereof. The second end cover is provided with the output shaft at the center. The transmission mechanism includes at least one first bevel gear, one second bevel gear, at least one axle, at least two supports, one wheel disc, at least one rod, one turntable component. At least one first bevel gear and a second bevel gear are fixedly connected to both sides of at least one axle, defining at least one I-shaped planet gear. Each of the first bevel gears at one end is engaged with the bevel gear ring, the diameter of the first bevel gear is larger than that of the center bevel gear. Each of the second bevel gear at the other end is engaged with the center bevel gear, the diameter of the center bevel gear is larger than that of the second bevel gear. Each axle is slidably connected to two supports fixed to the turntable. One end of each rod is slidably connected to the axle at the end of the first bevel gear, the other end is fixed on the turntable, the center of the turntable is fixed to the output shaft connected to the load end.

Yet alternatively, a multi-gear torquer includes a casing, a first end cover, a second end cover, an input shaft, a sun gear, a transmission mechanism, a bevel gear ring and an output shaft. The casing is fixed on the base and is provided with an oil inlet hole and an oil outlet hole, with lubricating oil disposed at the bottom. The first end cover and the second end cover are disposed on both sides of the casing, and the centers of the first end cover and the second end cover are respectively provided with the input shaft and the output shaft. The input shaft is fixed with a sun gear moving along the planet gear engaged therewith in the transmission mechanism. The planet gear moves along the bevel gear ring engaged therewith, the planet gear moves around the sun gear and drives the turntable, the center of the turntable is fixed with the output shaft connected to the load end.

The first end cover of the casing is fixed with the first bevel gear ring and the second bevel gear ring to form a cone disc provided with an input shaft at the centre thereof. The center of the second end cover is provided with the output shaft, the transmission mechanism includes at least one first bevel gear 218, a second bevel gear 208a and a third bevel gear 208b, at least one axle, at least two supports, one wheel disc, at least a rod and a turntable component. The at least one first bevel gear, the second bevel gear and the third bevel gear are fixed to both sides of at least one axel to define at least one planet gear shaped as a superimposed "T" and "horizontal H". The planet gear is provided with a first bevel gear at one end, the first bevel gear meshes with the sun gear. The diameter of the center bevel gear is larger than that of the first bevel gear. The other end of the planet gear is provided with a second bevel gear and a third bevel gear that respectively mesh with two bevel gear rings. The diameters of the second bevel gear and the third bevel gear are larger than that of the center bevel gear. Each axle is slidably connected to at least two supports fixed to the turntable. One end of each rod is slidably connected to the axle between the second bevel gear and the third bevel gear. The other end of each rod is fixed on the turntable and the centre of the turntable is fixed with the output shaft connected to the load end.

Further, a bearing is provided at the position where the axle is slidably connected to the rod.

According to the multi-gear torquer described in the disclosure, through the planet gears with different structures in the transmission mechanism and their different position layouts, during the movement of the planet gear driven by the planet gear, the resistance force in the transmission is resolved. A small torque is applied to the sun gear, thereby generating a large torque on the turntable. Although the rotation speed of the output shaft in the transmission is reduced, a large output torque is realized, such that the multi-gear torquer gets high mechanical efficiency and can be used as a power transmission device for automobiles, trains and other mechanical transmission equipment.

DETAILED DESCRIPTION OF EMBODIMENTS

Several embodiments of the invention are described in conjunction with the accompanying drawings. The description is for illustration purpose and not limited thereto, and features described in embodiments can be combined with each other.

Embodiment 1

Figure 1:
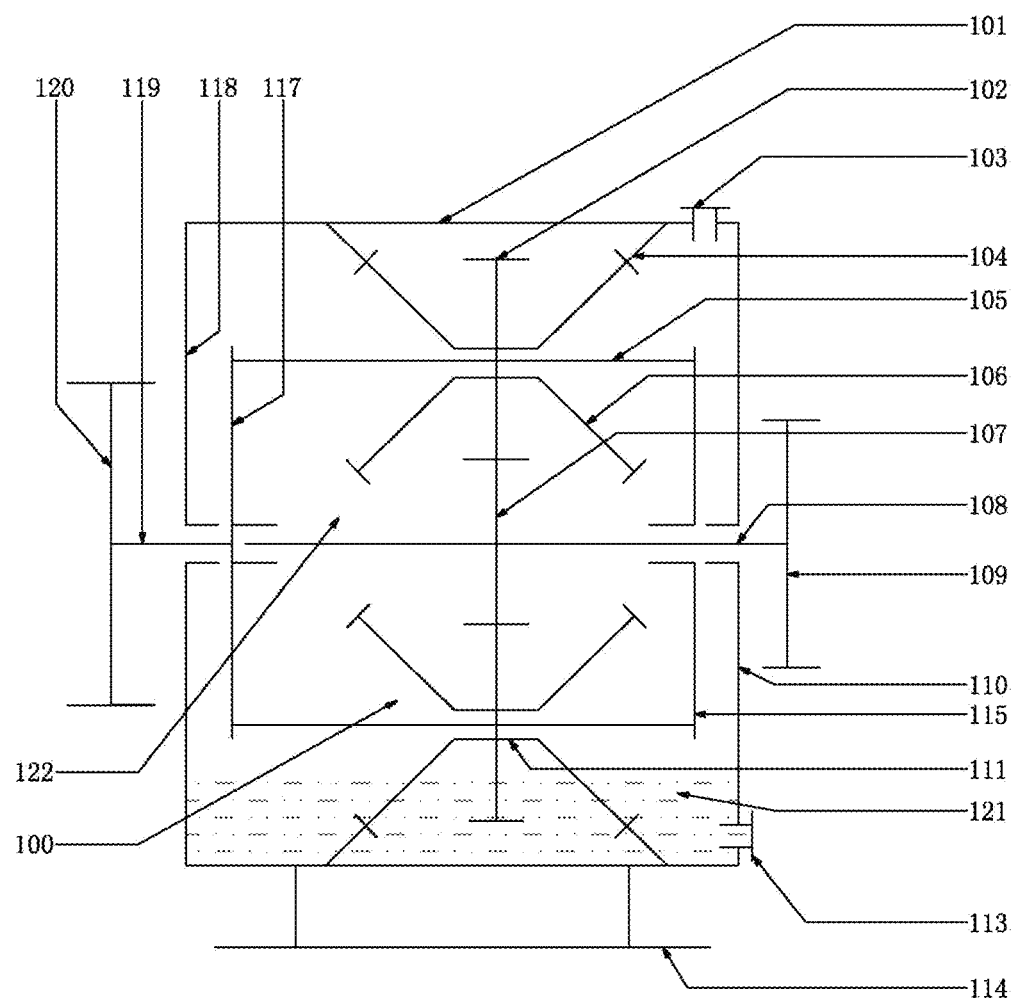
FIG. 1 is a schematic view of the multi-gear torquer according to a first embodiment of the present invention.

FIG. 1 is a schematic view of a multi-gear torquer according to the first embodiment of the present invention. As shown in FIG. 1, the multi-gear torquer includes a casing 101, a first end cover 110, a second end cover 118, an input shaft 108, a sun gear 107, a gear transmission mechanism 122 and an output shaft 119. The casing 101 is fixed on the base 114 and is provided with an oil inlet hole 103 and an oil outlet hole 113 thereon, with lubricating oil 121 at the bottom. The first end cover 110 and the second end cover 118 are set on both sides of the casing 101, with the first end cover 110 centrally provided with the input shaft 108 and the second end cover 118 centrally provided with the output shaft 119. An input wheel 109 is fixed on the input shaft 108. An output wheel 120 is fixed on the output shaft 119. Two ring gears 104 on the inner wall of the casing 101 are integrated with the casing 101. The transmission mechanism is provided with two first gears 102, four second gears 106, two axles 105, two bearings 111, a wheel disc 115, a turntable component 117. Four second gears 106 and two first gears 102 are fixedly connected to form two planet gears 100 each of which is shaped as a superimposed "T" and "horizontal H", and an axle 105 is provided in an axial direction of each planet gear 100. A first gear 102 is longitudinally set in a middle of the planet gear 100, two second gears 106 are provided on both sides of the planet gear 100, which are conical with the angle between the conical surfaces of the two second gears 106 is less than 180 degrees but greater than 0 degrees. The two second gears 106 are arranged in parallel and mesh with two ring gears 104. A first gear 102 meshes with the sun gear 107, the diameter of the sun gear 107 is larger than that of the first gear 102. Two planet gears 100 are inwardly provided with two bearings 111 slidably connected to two axles 105. One end of the axle 105 is fixed with the wheel disc 115, the other end of the axle 105 is fixed to the turntable 117 centrally fixed with the output shaft 119 connected to the load end, then power transmission is realized.

During the movement, the resistance of the turntable 117 is applied to the axle 105, and is applied to the planet gear through the axle 105. Two second gears 106 in each planet gear 100 mesh with two ring gears 104. The resistance of the turntable 117 is dissolved when the two second gears 106 mesh with the two ring gears 104.

The turntable 117 applies force to the axle 105, and the axle 105 applies force to the planet gear, the driving wheel disc, or the sun gear 107, applies force to the gear 102. Thus, the rotations of input shaft 108, the sun gear 107 and the first gear 102 move to drive the planet gear 100, then the planet gear 100 moves to drive the turntable 117, generating a large torque on the turntable 117, such that the turntable 117 drives the output shaft 119. Obviously, the multi-gear torquer described herein has strong anti-overload capability. The transmission efficiency is very high.

Embodiment 2

Figure 2:
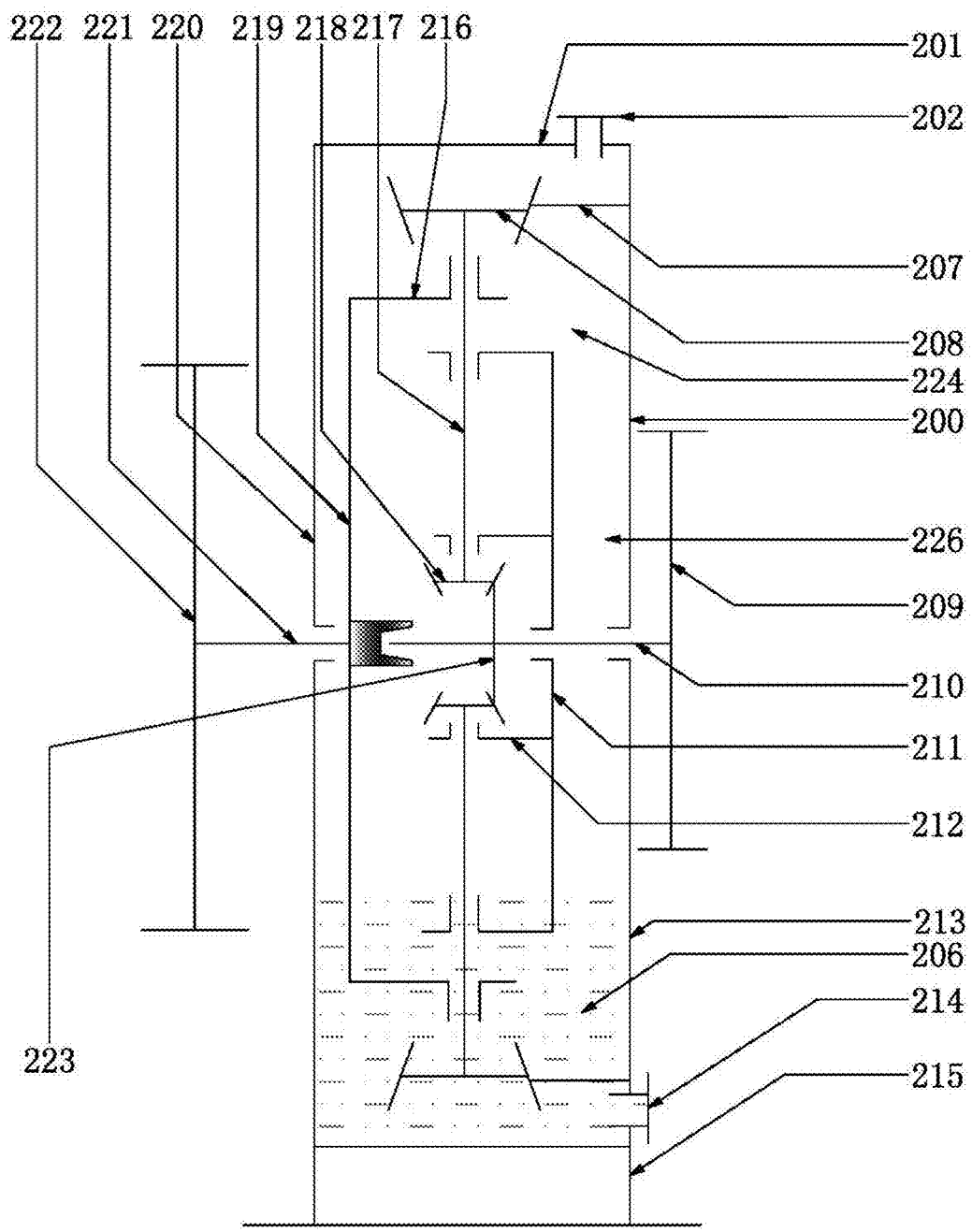
FIG. 2 is a schematic view of the multi-gear torquer according to a second embodiment of the present invention.

FIG. 2 is a schematic view of a multi-gear torquer according to the second embodiment of the present invention. As shown in FIG. 2, the multi-gear torquer includes a casing 201, a first end cover 213, a second end cover 220, an input shaft 210, a sun gear 223, a gear transmission mechanism 226 and an output shaft 221. Base 215 is fixed on the casing 201. The casing 201 is provided with an oil inlet hole 202 and an oil outlet hole 214 thereon, with lubricating oil 206 provided at the bottom. The first end cover 213 and the second end cover 220 on both sides is provided on the casing 201. A bevel gear ring 207 is fixed on the first end cover 213 to form a integrated structure that defines a cone disc 200 used as the first end cover 213. The input shaft 210 is set at the center of the cone disc 200, the output shaft 221 is set at the center of the second end cover 220. An input wheel 209 is fixed on the input shaft 210, an output wheel 222 is fixed on the output shaft 221. The input shaft 210 is slidably connected and passes through the end cover 213. A conical sun gear 223 meshed with the gear transmission mechanism 226 is fixed to the input shaft 210. The gear transmission mechanism 226 includes two first bevel gears 208, two second bevel gears 218, two axles 217, four supports 212, a wheel disc 211, two rods 216, a turntable component 219. Two first bevel gears 208 and two second bevel gears 218 are fixed to two ends of the two axles 217 to form two "T" shaped planet gears 224. Each of the first bevel gears 208 meshes with the bevel gear ring 207.

The diameter of the first bevel gear 208 is larger than that of the sun gear 223. Each of the second bevel gears 218 is engaged with the sun gear 223. The diameter of the sun gear 223 is larger than that of the bevel gears 218. Each axle 217 is slidably connected to two supports 212, each of the supports 212 is fixed to the wheel disc 211. One end of each of the rods 216 is slidably connected to the axle 217 at the end of the first bevel gear 208. The axle 217 is slidably connected to the connecting rod 216 by a bearing, the other end of the rod 216 is fixed on the turntable 219 centrally fixed with the output shaft 221 connected to the load end, then power transmission is realized.

Compared with the first embodiment, the second embodiment has a great change. The planet gear is changed from the shape of a superimposed "x" and "+" of the first embodiment to the "I" shape of the second embodiment. The ring gear 104 of the first embodiment is changed into the cone disc 200 of the second embodiment that the cone disc 200 is used as an end cover. The structure and the shape of the components in the second embodiment are obviously different from those of the first embodiment. Seemingly, they are different models, however, after carefully analyzed, the working principle of the second embodiment is the same as that of the first embodiment, that is, the resolution of force in the transmission is also implemented by the gear transmission mechanism. During the movement, the resistance of the turntable 219 is applied to the rod 216. The rod 216 applies the force to one end of the axle 217, close to the first bevel gear 208. The first bevel gear 208 is engaged with the bevel gear ring 207 as a fulcrum, such that the arm of force is small, and the resistance torque is small. The driving wheel, or the sun gear 223, meshes with the second bevel gear 218 to apply on the other end of the axle 217. The first bevel gear 208 of the axle 217 meshes with the bevel gear ring 207 as a fulcrum. The active force arm is big and the torque is large. Thus, the motion resistance on the axle 217 is resolved. The rotations of the input shaft 210 and the sun gear 223 are engaged with the movement of the second gear 218, the sun gear 223 applies a relatively small force to drive the planet gear 224 and the axle 217, and then drive the turntable 219 by the rod 216 to generate a large torque on the turntable 219, the turntable 219 drives the output shaft 221. Obviously, the multi-gear torquer described herein has strong anti-overload capability. The transmission efficiency is very high.

Embodiment 3

Figure 3:
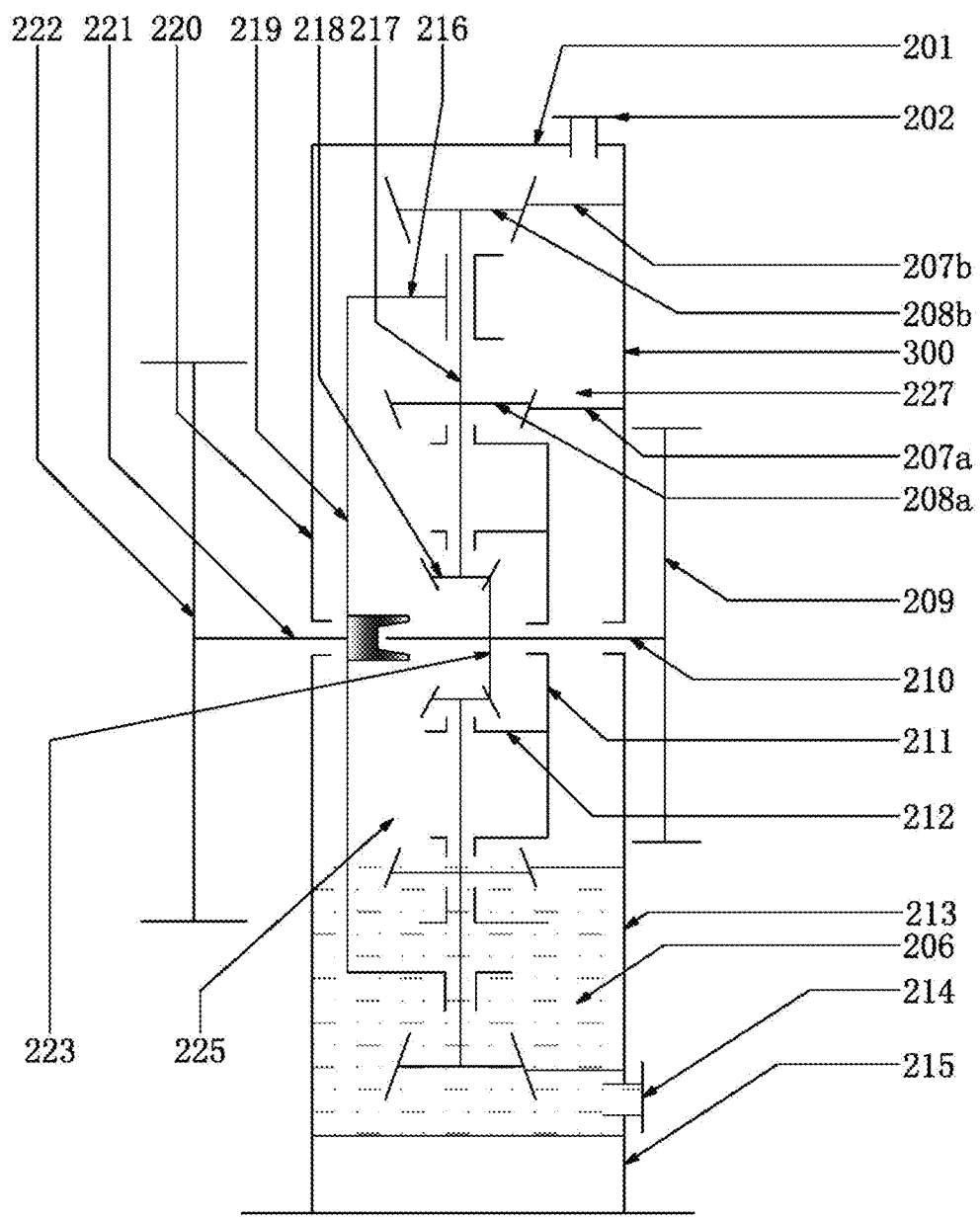
FIG. 3 is a schematic view of the multi-gear torquer according to a third embodiment of the present invention.

FIG. 3 is a schematic view of a three-wheel torquer according to a third embodiment of the present invention. As shown in FIG. 3, the multi-gear torquer includes a casing 201, a first end cover 213, a second end cover 220, an input shaft 210, a sun gear 223, a gear transmission mechanism 227 and an output shaft 221, wherein, a base 215 is fixed on the casing 201 provided thereon with an oil inlet hole 202 and an oil outlet hole 214 with lubricating oil 206 at the bottom. The first end cover 213 and the second end cover 220 are set on two sides of the casing 201. The first end cover 213 is fixed with a first bevel gear ring 207a and the second bevel gear ring 207b to form an integrated structure, further to define a cone disc 300 used as the first end cover 213. The center of the cone disc 300 is provided with the input shaft 210. The center of the second end cover 220 is provided with the output shaft 221. An input wheel 209 is fixed on the input shaft 210, and an output wheel 222 is fixed on the output shaft 221. The input shaft 210 is slidably connected and passes through the first end cover 213. The input shaft 210 is fixed with a conical sun gear 223 meshing with the gear transmission mechanism 227. The gear transmission mechanism 227 includes two first bevel gears 218, two bevel gears 208a, two third bevel gears 208b, two axles 217, four supports 212, one turntable 211, two rods 216 and a turntable 219. The two first bevel gears 218, the two second bevel gears 208a and the two third bevel gears 208b are fixed to the two ends of the two axles 217 to form two planet gears 225, and each of which is shaped as a superimposed "T" and "horizontal H", and is provided with a first bevel gear 218 at one end and a second bevel gear 208a and a third bevel gear 208b at the other end. Each of the axles 227 is slidably coupled to two supports 212 fixed to the wheel disc 211. Each of the first bevel gears 218 is engaged with the sun gear 223, the diameter of the sun gear 223 is larger than that of the first bevel gear 218. The second bevel gear 208a and the third bevel gear 208b are engaged with the two first ring gears 207a and the second ring gears 207b, the diameters of the second bevel gears 208a and the third bevel gears 208b are larger than that of the sun gear 223. One end of each of the rods 216 is slidably connected to the axle 217 between the second bevel gear 208a and the third bevel gear 208b, the other end is fixed to the turntable 219 centrally fixed with the output shaft 221 connected to the load end, then power transmission is realized.

The structure of the third embodiment is a bit different from the structure of the second embodiment. On the basis of the second embodiment, a second ring gear 207b and a big third bevel gear 208b are added, thus changing the "I" shaped planet gear 224 in the second embodiment to the planet gear 225 shaped as a superimposed "T" and "horizontal H" in the third embodiment. That one end of the rod 216 is slidably connected to the axle 217 at the end of the first bevel gear 208 in the second embodiment is changed to that one end of the rod 216 is slidably connected to the axle 217 between the second bevel gear 208a and the third bevel gear 208b in the third embodiment, so that the multi-gear torquer of the third embodiment rotates smoothly, and is suitable for a large multi-gear torquer. But the working principle and the basic features are also the same as that in the above embodiment, that is, the force in the transmission is also resolved by the gear transmission mechanism.

During the movement, the resistance of the turntable 219 is applies to the rod 216, then the connecting rod 216 acts on one end of the axle 217 slidably connected between the second bevel gear 208a and the third bevel gear 208b. The second bevel gear 208a and the third bevel gear 208b are engaged with the first bevel gear ring gear 207a and the second bevel gear ring gear 207b as fulcrums, the resistance arm is small, generating a smaller resistance torque. The driving wheel, or the sun gear 223, is engaged with the first bevel gear 218 acting on the other end of the axle 217. The second bevel gear 208a and the third bevel gear 208b on the same axle 217 is engaged with the first bevel gear ring 207a and the second bevel gear ring 207b as fulcrums, the active force arm formed is big with the torque is large, such that the motion resistance on the axle 217 is dissolved. The rotations of the input shaft 210 and the sun gear 223 are engaged with the movement of the first bevel gear 218, the sun gear 223 applies a relatively small force to drive the planet gear 225 and the axle 217, then the turntable 219 is driven by the rod 216 that a large torque is generated on the turntable 219 to drive the output shaft 221. Obviously, the multi-gear torquer described herein has strong anti-overload capability. The transmission efficiency is very high.

It should be noted that the above embodiments are for illustration purpose and are not limited thereto. The technical solutions described in the embodiments may be modified, or some or all of the technical features may be equivalently replaced without departing from the scope of present disclosure.

What is claimed is:

1. A multi-gear torquer, comprising:
a casing,
a first end cover,
a second end cover,
an input shaft,
a sun gear,
a transmission mechanism,
a plurality of ring gears, and
an output shaft;
wherein the casing is fixed on a base and is provided with an oil inlet hole and an oil outlet hole, with lubricating oil provided at a lower part; the first end cover and the second end cover are provided on both sides of the casing; the input shaft and the output shaft are respectively provided at the center of the first end cover and the second end cover; the sun gear is fixed on the input shaft and meshes with a planet gear of the transmission mechanism; the planet gear meshes with one of the plurality of ring gears and moves around the sun gear to drive a rotatable disk to move; the output shaft is centrally fixed on the rotatable disk and is connected to a load end; and
two of the plurality of ring gears are integrated with an inner wall of the casing;
the transmission mechanism comprises at least three gears, at least one axle, a wheel disc and the rotatable disk; the at least three gears are in fixed contact to define the planet gear as at least one planet gear shaped as a superimposed "x" and "+"; the axle is set in an axial direction of the planet gear shaped as the superimposed "x" and "+"; a first gear of the at least three gears is provided in a longitudinal direction of the planet gear; two of the at least three gears are second gears which are positioned on each side of the first gear, respectively, both of two second gears are arranged in parallel to engage with the two ring gears; the first gear meshes with the sun gear; a diameter of the sun gear is larger than that of the first gear; the planet gear slidably contacts with the axle; one end of the axle is fixed to the wheel disc, and the other end is fixed to the rotatable disk centrally fixed with the output shaft connected to the load end; and
each of the two second gears is conical; an angle between conical interfaces of the two second gears is less than 180 degrees and greater than 0 degrees; and the planet gear is interiorly provided with a bearing slidably connected to the axle.

2. A multi-gear torquer, comprising:
a casing,
a first end cover,
a second end cover,
an input shaft,
a sun gear,
a transmission mechanism,
a bevel gear ring, and
an output shaft;
wherein the casing is fixed on a base and is provided with an oil inlet hole and an oil outlet hole, with lubricating oil provided at a lower part; the first end cover and the second end cover are provided on both sides of the casing; the input shaft and the output shaft are provided at the center of the first end cover and the second end cover respectively; the input shaft and the output shaft are respectively provided at centers of the first end cover and the second end cover; the sun gear is fixed on the input shaft and meshes with a planet gear of the transmission mechanism; the planet gear meshes with the bevel gear ring and moves around the sun gear to drive a rotatable disk to move; the output shaft is centrally fixed on the rotatable disk and is connected to a load end; and
the first end cover is fixed with the bevel gear ring to define a cone disc centrally provided with the input shaft; the second end cover is centrally provided with the output shaft; the transmission mechanism comprises at least one first bevel gear, a second bevel gear, at least one axle, at least two supports, a wheel disc, at least one rod and the rotatable disk;
the at least one first bevel gear and the second bevel gear are fixed to two ends of the at least one axle to define the planet gear as at least one I-shaped planet gear; each of the first bevel gears at one end meshes with the bevel gear ring; wherein the diameter of the first bevel gear is larger than that of the sun gear; each of the second bevel gears is engaged with the sun gear at the other end, wherein the diameter of the sun gear is larger than that of the second bevel gear; each axle is slidably connected to the two supports fixed to the wheel disc; one end of each rod is slidably connected to the axle at the end of the first bevel gear; the other end of the rod is fixed on the rotatable disk centrally fixed with the output shaft connected to a load end.

3. The multi-gear torquer according to claim 2, wherein a bearing is provided at the position where the axle is slidably connected with the rod.

4. A multi-gear torquer, comprising:
a casing,
a first end cover,
a second end cover,
an input shaft,
a sun gear,
a transmission mechanism,
a plurality of bevel gear rings, and
an output shaft;
wherein the casing is fixed on a base and is provided with an oil inlet hole and an oil outlet hole, with lubricating oil provided at a lower part; the first end cover and the second end cover are provided on both sides of the casing; the input shaft and the output shaft are provided at the center of the first end cover and the second end cover respectively; the input shaft and the output shaft are respectively provided at centers of the first end cover and the second end cover; the sun gear is fixed on the input shaft and meshes with a planet gear of the transmission mechanism; the planet gear meshes with the plurality of bevel gear rings and moves around the sun gear to drive a rotatable disk to move; the output shaft is centrally fixed on the rotatable disk and is connected to a load end; and
the first end cover is fixed with a first bevel gear ring and a second bevel gear ring of the a plurality of bevel gear rings to define a cone disc centrally provided with the input shaft; the output shaft is provided at the center of the second end cover; the transmission mechanism comprises at least one first bevel gear, a second bevel gear, a third bevel gear, at least one axle, at least two supports, a wheel disc, at least one rod and the rotatable disk; the at least one first bevel gear, the second bevel gear and the third bevel gear are fixed to two ends of the at least one axle to define the planet gear as at least one planet gear shaped as a superimposed "T" and "horizontal H"; the first bevel gear is provided at one end of the planet gear and meshes with the sun gear; a diameter of the sun gear is larger than that of the first bevel gear; the second bevel gear and the third bevel gear are provided at the other end of the planet gear and respectively mesh with the first bevel gear ring and the second bevel gear ring; diameters of the second bevel gear and the third bevel gear are larger than that of the sun gear; each axle is slidably connected to at least two supports fixed to the wheel disc; one end of each rod is slidably connected to the axle between the second bevel gear and the third bevel gear, with the other end fixed on the rotatable disk centrally fixed with the output shaft connected to a load end.

5. The multi-gear torquer according to claim 4, wherein a bearing is provided at the position where the axle is slidably connected to the rod.

\* \* \* \* \*